United States Patent [19]

Masuda et al.

[11] Patent Number: 5,732,182

[45] Date of Patent: Mar. 24, 1998

[54] COLOR IMAGE SIGNAL RECORDING/REPRODUCING APPARATUS

[75] Inventors: Michiharu Masuda; Kazuyuki Iwamoto, both of Tokyo, Japan

[73] Assignee: Canon Kabushiki Kaisha, Tokyo, Japan

[21] Appl. No.: 598,735

[22] Filed: Feb. 8, 1996

Related U.S. Application Data

[63] Continuation of Ser. No. 167,236, Dec. 14, 1993, abandoned.

[30] Foreign Application Priority Data

Dec. 21, 1992 [JP] Japan ................................. 4-356261

[51] Int. Cl.$^6$ ........................................................ H04N 9/79
[52] U.S. Cl. ........................................................ 386/1; 386/2
[58] Field of Search ........................................ 358/310, 314, 358/315, 340, 342, 906, 328, 329; 386/46, 906, 909.1, 47, 51, 1, 2; H04N 9/79

[56] References Cited

U.S. PATENT DOCUMENTS

| | | | |
|---|---|---|---|
| 4,315,276 | 2/1982 | Harada et al. | 358/336 |
| 4,771,341 | 9/1988 | Shimizu et al. | 358/329 |
| 4,829,388 | 5/1989 | Nakayama et al. | 386/47 |
| 5,016,111 | 5/1991 | Sakamoto et al. | 358/329 |
| 5,223,942 | 6/1993 | Sakaegi et al. | 358/310 |
| 5,241,398 | 8/1993 | Urata et al. | 358/336 |
| 5,293,248 | 3/1994 | Bergen et al. | 358/310 |
| 5,301,026 | 4/1994 | Lee | 358/906 |

*Primary Examiner*—Thai Tran
*Assistant Examiner*—Huy Nguyen
*Attorney, Agent, or Firm*—Robin, Blecker, Daley and Driscoll

[57] ABSTRACT

An information signal recording and/or reproducing apparatus is arranged to selectively input any one kind of information signal from among a plurality of kinds of information signals which are externally supplied and an information signal reproduced from a recording medium, and control the operation of recording the information signal, in accordance with the state of the input information signal. Accordingly, the apparatus is capable of accurately and stably recording and/or reproducing the information signal on the recording medium.

4 Claims, 6 Drawing Sheets

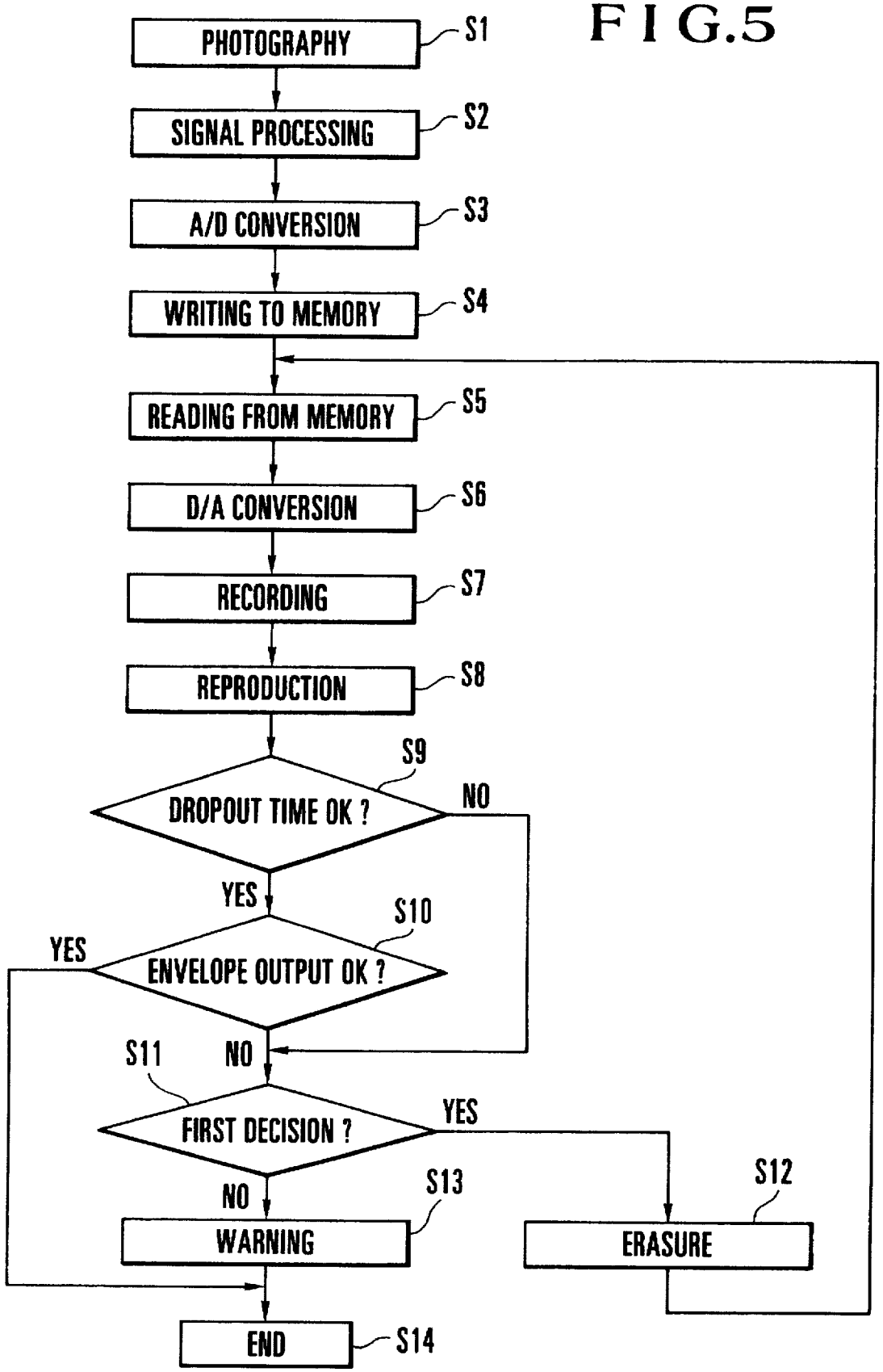
F I G. 5

COLOR IMAGE SIGNAL RECORDING/REPRODUCING APPARATUS

This is a continuation application under 37 CFR 1.62 of prior application Ser. No. 08/167,236 filed Dec. 14, 1993, abandoned.

BACKGROUND OF THE INVENTION

1. Field of the Invention

The present invention relates to an information signal recording and/or recording apparatus arranged to record an information signal on a recording medium and/or reproduce an information signal recorded on the recording medium.

2. Description of the Related Art

FIG. 1 is a schematic block diagram showing the arrangement of a conventional still image signal recording and/or reproducing apparatus. The arrangement shown in FIG. 1 includes a matrix circuit 1 for converting an RGB signal into a luminance signal and color-difference signals, a switching circuit 2 for selectively outputting a luminance signal and a video signal (V), a comb filter 5' for separating the video signal into a luminance signal and a chroma signal, a switching circuit 10 for selectively outputting the luminance signals, a switching circuit 11 for selectively outputting the chroma signal and a chroma signal (C), a decoder circuit 12 for converting the chroma signal outputted from the switching circuit 11 into color-difference signals, a switching circuit 13 for selectively outputting the color-difference signals, A/D conversion circuits 17, 18 and 19, a memory 20, D/A conversion circuits 21, 22 and 23, an output circuit 27 for converting the luminance signal and the color-difference signals into an RGB signal (R, G, B, SYNC), a video signal (V) and an S video signal (Y+S, C) and outputting these signals, a frequency demodulator 28 for demodulating a reproduced FM (frequency-modulated) signal, a recording/reproducing amplifier 29 for recording or reproducing an FM signal on or from a recording medium, a magnetic head 30, an addition circuit 31 for adding together a luminance FM signal and a chroma FM signal, a frequency modulator 32 for modulating a luminance signal into the luminance FM signal, a frequency modulator 33 for modulating a chroma signal into the chroma FM signal, a recording medium 34, and an AGC (automatic gain control) circuit 35 for holding the amplitude of the luminance signal to be inputted to the frequency modulator 32 at a constant level.

In the following description, the above-noted RGB signal indicates a signal made up of an R signal, a G signal and a B signal as well as a sync signal (SYNC), the video signal (V) indicates a so-called composite video signal, and the S video signal indicates a signal made up of the luminance signal (Y+S) and the chroma signal (C).

The operation of the conventional still image signal recording and/or reproducing apparatus having the above-described arrangement will be described below. If an RGB signal input (R, G, B, SYNC) is selected, the input RGB signal is converted into a luminance signal and color-difference signals by the matrix circuit 1. The luminance signal is supplied to the A/D conversion circuit 17 via the switching circuit 2 and the switching circuit 10 and converted into a digital signal by the A/D conversion circuit 17. The obtained digital signal is stored in the memory 20. In the meantime, the color-difference signals are supplied to the A/D conversion circuits 18 and 19 via the switching circuit 13 and converted into digital signals by the A/D conversion circuits 18 and 19. The obtained digital signals are stored in the memory 20.

If a video signal input is selected, the input video signal (V) is supplied to the comb filter 5' via the switching circuit 2 and separated into a luminance signal and a chroma signal by the comb filter 5'. The luminance signal is supplied to the A/D conversion circuit 17 via the switching circuit 10 and converted into a digital signal by the A/D conversion circuit 17. The obtained digital signal is stored in the memory 20. Also, the separated chroma signal is supplied to the decoder circuit 12 via the switching circuit 11 and converted into color-difference signals by the decoder circuit 12. The obtained color-difference signals are supplied to the A/D conversion circuits 18 and 19 via the switching circuit 13 and converted into digital signals by the A/D conversion circuits 18 and 19. The obtained digital signals are stored in the memory 20.

If an S video signal input is selected, the luminance signal (Y+S) is supplied to the A/D conversion circuit 17 via the switching circuit 2 and the switching circuit 10 and converted into a digital signal by the A/D conversion circuit 17. The obtained digital signal is stored in the memory 20. Also, the chroma signal (C) is passed through the switching circuit 11 and subjected to processing similar to that executed when the video signal input is selected. The obtained color-difference signals are stored in the memory 20.

The luminance signal and the color-difference signals, which have been obtained from any selected one of the above-described signal inputs and have been stored in the memory 20, are outputted to the respective D/A conversion circuits 21 to 23. After the luminance signal and the color-difference signals are converted into analog signals by the respective D/A conversion circuits 21 to 23, the analog signals are inputted to the output circuit 27 and outputted therefrom in the form of the RGB signal (R, G, B, SYNC), the video signal (V) or the S video signal (Y+S, C).

If any selected one of the above-described input signals is to be recorded on the recording medium 34, a picture to be recorded is frozen in the memory 20. The luminance signal and the color-difference signals of the frozen picture are outputted to and converted into analog signals by the respective D/A conversion circuits 21 to 23. The analog signals are outputted from the output circuit 27 in the form of the RGB signal (R, G, B, SYNC), the video signal (V) or the S video signal (Y+S, C). At the same time, the luminance signal is supplied to the AGC circuit 35 so that its gain is held at a constant level in order to prevent reversal or degradation in frequency characteristic during frequency modulation, and the signal outputted from the AGC circuit 35 is inputted to the frequency modulator 32. Also, the color-difference signals are inputted to and frequency-modulated by the frequency modulator 33. The FM signals outputted from the frequency modulators 32 and 33 are added together by the addition circuit 31. The signal outputted from the addition circuit 31 is recorded on the recording medium 34 by the recording/reproducing amplifier 29 and the magnetic head 30.

If a signal is to be reproduced from the recording medium 34, an FM signal recorded on the recording medium 34 is converted into an electrical signal by the magnetic head 30, and the electrical signal is amplified by the recording/reproducing amplifier 29 and is then inputted to the frequency demodulator 28. The reproduced FM signal inputted to the frequency demodulator 28 is demodulated into a luminance signal and color-difference signals. The luminance signal is supplied to the A/D conversion circuit 17 via the switching circuit 2 and the switching circuit 10 and converted into a digital signal by the A/D conversion circuit 17. The digital signal is stored in the memory 20. Also, the demodulated color-difference signals are supplied to the A/D conversion circuits 18 and 19 via the switching circuit 13 and converted into digital signals by the A/D conversion circuits 18 and 19. The digital signals are stored in the memory 20. The luminance signal and the color-difference signals which have been stored in the memory 20 are outputted to the D/A conversion circuits 21 to 23. After the luminance signal and the color-difference signals are converted into analog signals by the D/A conversion circuits 21 to 23, the analog signals are inputted to the output circuit 27. The analog signals are outputted from the output circuit 27 in the form of the RGB signal (R, G, B, SYNC), the video signal (V) or the S video signal (Y+S, C).

However, the above-described conventional example has the following disadvantages since each of the input signals or the signal recorded on the recording medium has an amplitude which is not always constant and varies to some extent.

(i) The comb filter 5' is designed on the assumption that its input has an amplitude similar to the amplitude of a standard signal. If a signal, the amplitude of which exceeds the dynamic range of the comb filter 5', is inputted to the comb filter 5', a distortion will occur in the output signal.

(ii) The A/D conversion circuit 17 is designed on the assumption that its input has an amplitude similar to the amplitude of a standard signal. If a signal, the amplitude of which exceeds the dynamic range of the A/D conversion circuit 17 is inputted to the A/D conversion circuit 17, a distortion will occur in the output signal. If the input signal has an amplitude smaller than that of the standard signal, the resolution of the A/D conversion circuit 17 becomes low, leading to degradation of the output signal.

An electronic still camera which is one type of conventional still image signal recording and/or reproducing apparatus has a number of other problems. For example, if an abnormal photography is recorded by any cause during photographic recording using the electronic still camera, a photographer can confirm the recorded photography through a reproduced image, but cannot re-record the same scene. As a result, the photographer will miss the opportunity to photograph and record a precious scene. Even if the photographer records a single scene in the form of a plurality of exposures in order to prevent such a photographic failure, it is extremely difficult to record completely the same scene on each of the recorded exposures.

SUMMARY OF THE INVENTION

It is, therefore, an object of the present invention to provide an information signal recording and/or reproducing apparatus capable of solving the above-described problems.

Another object of the present invention is to provide an information signal recording and/or reproducing apparatus capable of accurately recording an information signal on a recording medium.

To achieve the above objects, in accordance with one aspect of the present invention, there is provided an information signal recording and/or reproducing apparatus arranged to record an information signal on a recording medium and/or reproduce an information signal recorded on the recording medium, which apparatus comprises recording and/or reproducing means for receiving an input information signal and recording the input information signal on the recording medium, and/or reproducing an information signal recorded on the recording medium, information signal inputting means for selectively inputting any one kind of information signal from among a plurality of kinds of information signals which are externally supplied and the information signal reproduced from the recording medium by the recording and/or reproducing means, and recording-operation controlling means for controlling an information-signal recording operation executed by the recording and/or reproducing means, in accordance with a state of the information signal selectively inputted by the information signal inputting means.

Another object of the present invention is to provide an information signal recording and/or reproducing apparatus capable of performing more stable recording and/or reproduction of an information signal by means of a simple arrangement.

To achieve the above object, in accordance with another aspect of the present invention, there is provided an information signal recording and/or reproducing apparatus arranged to record an information signal on a recording medium and/or reproduce an information signal recorded on the recording medium, which apparatus comprises information signal inputting means for selectively inputting any one kind of information signal from among a plurality of kinds of information signals which are externally supplied and an information signal reproduced from the recording medium, level adjusting means for automatically adjusting a signal level of the information signal selectively inputted by the information signal inputting means and outputting the information signal of adjusted signal level, and recording means for recording the information signal outputted from the level adjusting means on the recording medium.

A further object of the present invention is to provide an information signal recording and/or reproducing apparatus capable of preventing erroneous recording of an information signal by means of a simple arrangement.

To achieve the above object, in accordance with another aspect of the present invention, there is provided an information signal recording and/or reproducing apparatus arranged to record an information signal on a recording medium and/or reproduce an information signal recorded on the recording medium, which apparatus comprises storage means for receiving an input information signal and temporarily storing the input information signal, recording and/or reproducing means for receiving the input information signal and recording the input information signal on the recording medium, and/or reproducing an information signal recorded on the recording medium, detecting means for detecting whether an abnormality has occurred in the information signal reproduced from the recording medium by the recording and/or reproducing means, and controlling means for controlling an operation of each part so that the information signal stored in the storage means is recorded on the recording medium, if the detecting means detects an abnormality in the input information signal which is reproduced from the recording medium by the recording and/or reproducing means after having been recorded by the recording and/or reproducing means.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 5 is a flowchart showing the sequence of recording processing performed in the electronic still camera shown in FIG. 4.

DETAILED DESCRIPTION OF THE PREFERRED EMBODIMENTS

Preferred embodiments of the present invention will be described below with reference to the accompanying drawings.

Figure 1:
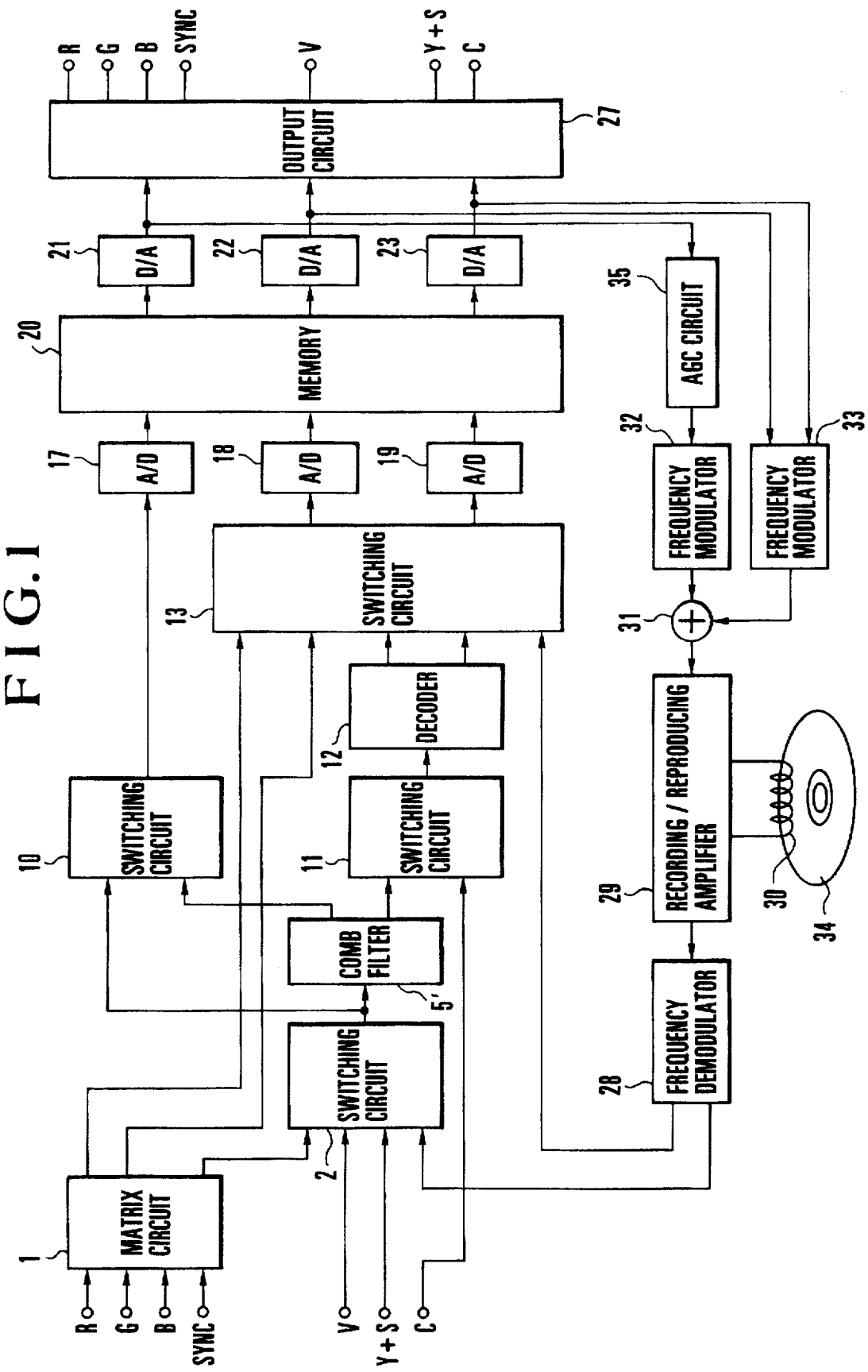
FIG. 1 is a schematic block diagram showing the arrangement of a conventional still image signal recording and/or reproducing apparatus.
Figure 2:
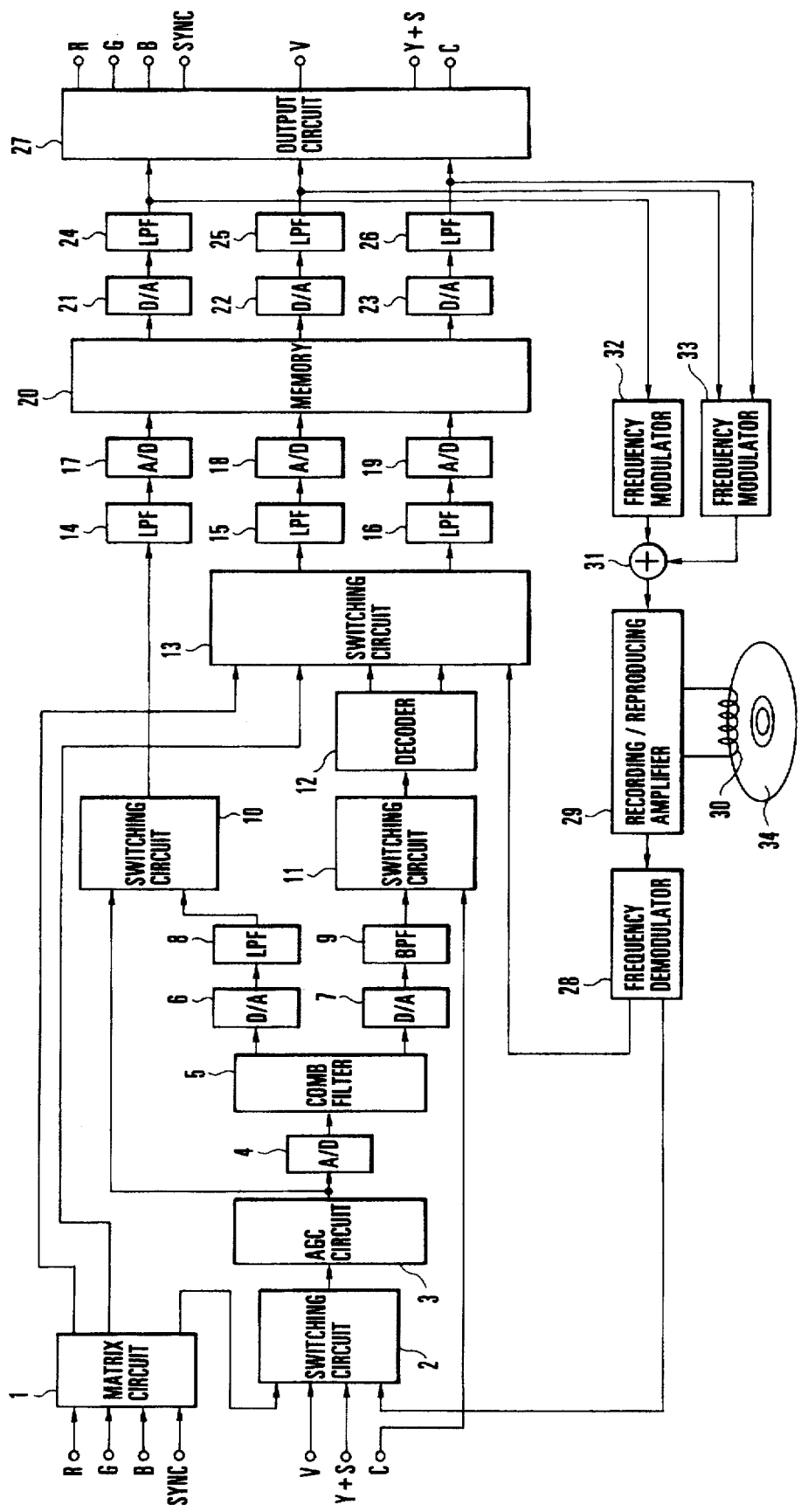
FIG. 2 is a schematic block diagram showing the arrangement of a still image signal recording and/or reproducing apparatus according to a first embodiment of the present invention.

FIG. 2 is a schematic block diagram showing the arrangement of a still image signal recording and/or reproducing apparatus according to a first embodiment of the present invention. In FIG. 2, identical reference numerals are used to denote constituent elements substantially identical to those of the conventional example shown in FIG. 1.

The embodiment shown in FIG. 2 is distinct from the conventional example shown in FIG. 1 in that an AGC circuit for automatically adjusting its gain in accordance with the amplitude of an input signal and providing an output of constant amplitude is disposed not between a memory 20 and a frequency modulator 32 but immediately after the switching circuit 2.

Since the embodiment shown in FIG. 2 has an arrangement which is basically identically to that of the conventional still image signal recording and/or reproducing apparatus shown in FIG. 1, detailed description of the arrangement is omitted, and the operation thereof will be described below.

The arrangement shown in FIG. 2 includes, in addition to elements substantially identical to those of the conventional still image signal recording and/or reproducing apparatus, an AGC circuit 3 for providing an output of constant amplitude, an A/D conversion circuit 4, a digital comb filter 5 for separating a video signal into a luminance signal and a chroma signal, D/A conversion circuits 6 and 7, low-pass filters 8, 14 and 24 for the luminance signal, a band-pass filter 9 for the chroma signal, and low-pass filters 15, 16, 25 and 26 for color-difference signals.

If an RGB signal input is selected, an RGB signal the amplitude of which varies generally to some extent with respect to the amplitude of a standard signal is converted into a luminance signal and color-difference signals by a matrix circuit 1. The luminance signal is supplied to the AGC circuit 3 via the switching circuit 2 and converted into a luminance signal of constant amplitude by the AGC circuit 3. The luminance signal outputted from the AGC circuit 3 is supplied to an A/D conversion circuit 17 via the low-pass filter 14 and converted into a digital signal by the A/D conversion circuit 17. The digital signal is stored in a memory 20.

If a video signal input is selected, a video signal the amplitude of which varies generally to some extent with respect to the amplitude of a standard signal is supplied to the AGC circuit 3 via the switching circuit 2 and converted into a video signal of constant amplitude by the AGC circuit 3. The video signal outputted from the AGC circuit 3 is converted into a digital signal by the A/D conversion circuit 4, and the digital video signal is separated into a luminance signal and a chroma signal by the comb filter 5. The separated luminance signal is converted into an analog signal by the D/A conversion circuit 6, and the analog signal is supplied to the A/D conversion circuit 17 via the low-pass filter 8, the switching circuit 10 and the low-pass filter 14 and converted into a digital signal by the A/D conversion circuit 17. The digital signal is stored in the memory 20.

If an S video signal input is selected, an S video signal the amplitude of which varies generally to some extent with respect to the amplitude of a standard signal is supplied to the AGC circuit 3 via the switching circuit 2 and converted into an S video signal of constant amplitude by the AGC circuit 3. The S video signal outputted from the AGC circuit 3 is supplied to the A/D conversion circuit 17 via the switching circuit 10 and the low-pass filter 14 and converted into a digital signal by the A/D conversion circuit 17. The digital signal is stored in the memory 20.

The manner of recording of each of the aforesaid input signals will be described below. In the conventional example, an AGC circuit 35 is disposed immediately before the frequency modulator 32 so that the amplitude of a luminance signal to be frequency-modulated is held at a constant level. In the shown embodiment, no AGC circuit is disposed immediately before the frequency modulator 32. However, the embodiment is arranged in such a manner that the luminance signal of each of the RGB, video and S video inputs necessarily passes through the AGC circuit 3, whereby the amplitude of the luminance signal to be inputted to the frequency modulator 32 is held at a constant level.

The manner of reproduction of a signal from a recording medium 34 will be described below. If a luminance signal of the reproduced signal, the amplitude of which varies generally to some extent with respect to the amplitude of a standard signal is outputted from a frequency demodulator 28, the luminance signal is supplied to the AGC circuit 3 via switching circuit 2 and converted into a luminance signal of constant amplitude by the AGC circuit 3. The luminance signal outputted from the AGC circuit 3 is supplied to the A/D conversion circuit 17 via the switching circuit 10 and the low-pass filter 14 and converted into a digital signal by the A/D conversion circuit 17. The digital signal is stored in the memory 20.

Since the embodiment is arranged in such a manner that the AGC circuit is disposed not immediately before the frequency modulator 32, as in the case of the conventional example, but immediately after the switching circuit 2, the following advantages can be achieved (i) The amplitude of a video signal to be inputted to the A/D conversion circuit 4 for the digital comb filter 5 is always held at a constant level so that A/D conversion is performed at its maximum resolution at all times, whereby it is possible to minimize degradation of the video signal.

(ii) The amplitude of a luminance signal to be inputted to the A/D conversion circuit 17 for the memory 20 is always held at a constant level so that A/D conversion is performed at its maximum resolution at all times, whereby it is possible to minimize degradation of the luminance signal.

(iii) It is possible to adopt a common AGC circuit arrangement as the AGC circuit having the above-described two advantages and an AGC circuit for frequency-modulating a luminance signal in a recording operation.

The above description of the first embodiment has referred to the still image signal recording and/or reproducing apparatus having the digital comb filter 5 for separating a video signal into a luminance signal and a chroma signal. However, the present invention can be applied to a still image signal recording and/or reproducing apparatus having an analog comb filter for separating a video signal into a luminance signal and a chroma signal.

Figure 3:
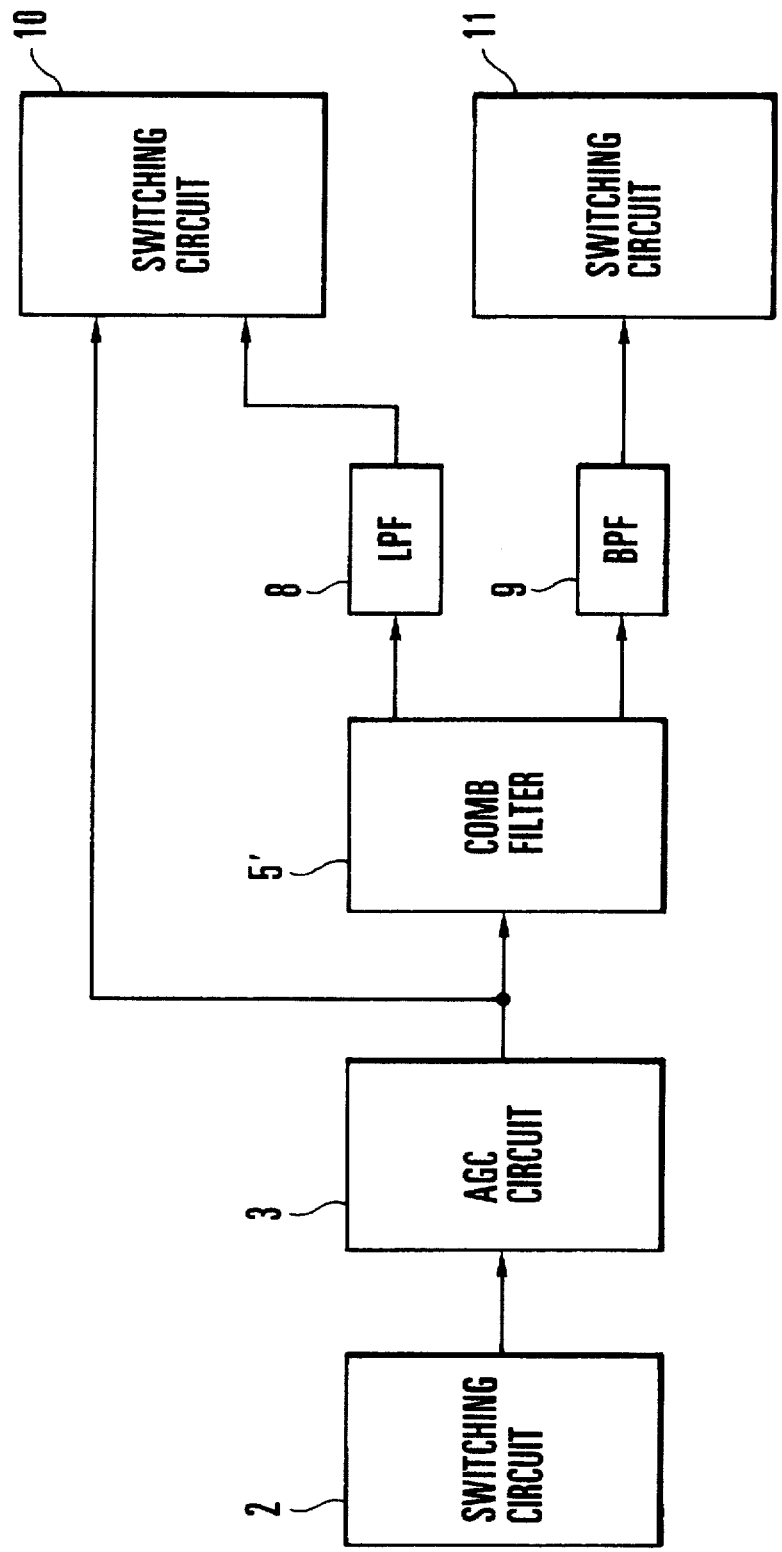
FIG. 3 is a schematic block diagram showing the arrangement of a modified portion of the first embodiment shown in FIG. 2.

FIG. 3 is a fragmentary block diagram showing the arrangement of a modified portion of the first embodiment, in which the digital comb filter 5 shown in FIG. 2 is replaced with an analog comb filter. In FIG. 3, the analog comb filter is indicated by reference numeral 5', and identical reference numerals are used to denote members having functions similar to those of the members shown in FIG. 2.

The above description of the first embodiment has referred to the still image signal recording and/or reproducing apparatus having a memory circuit. However, the present invention can be applied to a still image signal recording and/or reproducing apparatus having no memory circuit.

A second embodiment of the present invention will be described below with reference to FIGS. 4 to 6. The second embodiment relates to an electronic still camera which is one type of conventional still image signal recording and/or reproducing apparatus, and is intended to solve the above-described problem of the conventional still image signal recording and/or reproducing apparatus. The problem is that if an abnormal photography is recorded by any cause during photographic recording using the electronic still camera, a photographer can confirm the recorded photography through a reproduced image, but cannot re-record the same scene. As a result, the photographer will miss the opportunity to photograph and record an important scene. Even if the photographer records a single scene in the form of a plurality of exposures in order to prevent such a photographic failure, it is extremely difficult to record completely the same scene on each of the recorded exposures.

Figure 4:
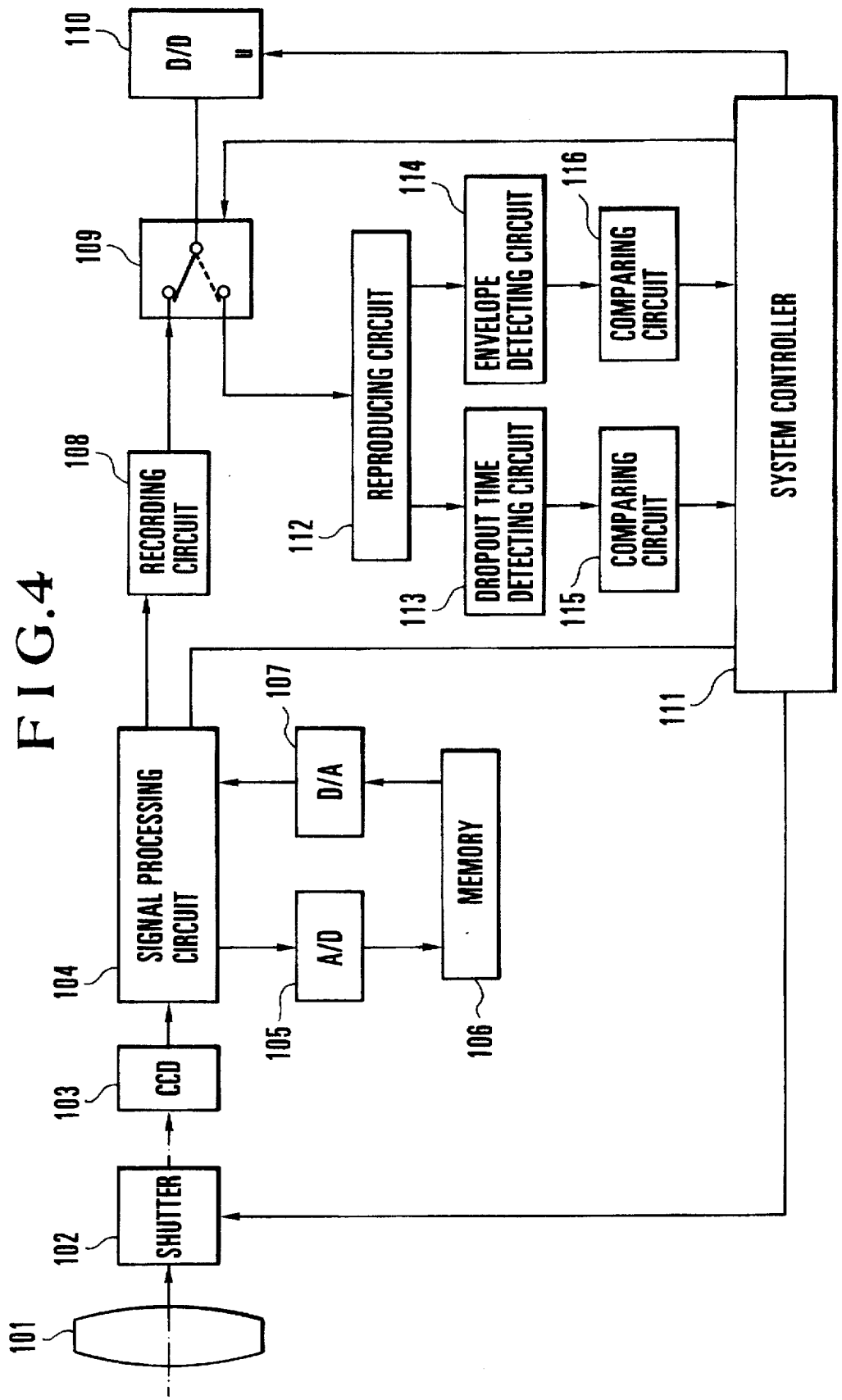
FIG. 4 is a schematic block diagram showing the arrangement of an electronic still camera according to a second embodiment of the present invention.

FIG. 4 is a schematic block diagram showing the arrangement of an electronic still camera according to the second embodiment of the present invention. The arrangement shown in FIG. 4 includes a photographic lens 101, a shutter 102, an image pickup element (CCD) 103, a signal processing circuit 104 for processing an image signal outputted from the CCD 103, an A/D conversion circuit 105 for converting an analog image signal outputted from the signal processing circuit 104 into a digital image signal, a memory 106 for storing the digital image signal, a D/A conversion circuit 107 for converting the digital image signal read from the memory 106 into an analog signal, a recording circuit 108 for recording a signal outputted from the signal processing circuit 104, a switch 109 for switching a disk drive unit 110 between a connection with the recording circuit 108 and a connection with a reproducing circuit 112, the disk drive unit 110 for recording and/or reproducing a signal on and/or from a magnetic disk (not shown), a system controller 111, the reproducing circuit 112 for performing reproduction, a dropout time detecting circuit 113 for detecting a dropout time from a reproduced signal outputted from the reproducing circuit 112, an envelope detecting circuit 114 for detecting an envelope from the reproduced signal outputted from the reproducing circuit 112, a first comparing circuit 115 for comparing the dropout time detected by the dropout time detecting circuit 113 with a predetermined value, and a second comparing circuit 116 for comparing an envelope output provided by the envelope detecting circuit 114 with a predetermine value.

The operation of the above-described electronic still camera will be described below. When a release button (not shown) is pressed, the shutter 102 is driven by the system controller 111 and a subject image is formed on the CCD 103 through the photographic lens 101 and the shutter 102. An image signal obtained at the CCD 103 is subjected to signal processing by the signal processing circuit 104, and an analog signal outputted from the signal processing circuit 104 is converted into a digital signal by the A/D conversion circuit 105. The digital signal is stored in the memory 106. The digital signal read from the memory 106 is converted into an analog signal by the D/A conversion circuit 107, and the analog signal is inputted to the signal processing circuit 104. The system controller 111 switches the switch 109 to a recording side, and the output signal of the recording circuit 108 is supplied to the disk drive unit 110 via the switch 109 so that the signal is recorded on the magnetic disk (not shown). Immediately after this recording, the system controller 111 switches the switch 109 to a reproduction side and the recorded signal is reproduced by the reproducing circuit 112, and the reproduced signal is inputted to each of the dropout time detecting circuit 113 and the envelope detecting circuit 114. A dropout time detected by the dropout time detecting circuit 113 is compared with the predetermined value by the first comparing circuit 115. If it is determined that the dropout time is greater than the predetermined value, information indicative of this decision is transmitted to the system controller 111. An envelope output provided by the envelope detecting circuit 114 is compared with the predetermined value by the second comparing circuit 116. If it is determined that the envelope output is smaller than the predetermined value, information indicative of this decision is transmitted to the system controller 111. If the information is inputted to the system controller 111 from either one of the first comparing circuit 115 and the second comparing circuit 116, the system controller 111 switches the switch 109 to the recording side. After a track in which a recording failure has occurred has been erased, the image signal stored in the memory 106 is re-recorded on the magnetic disk (not shown) in the disk drive unit 110 by the recording circuit 108.

FIG. 5 is a flowchart showing one example of a control sequence executed by the system controller 111. First, a signal obtained by photography (Step S1) is subjected to signal processing (Step S2). The signal is subjected to A/D conversion and the digital signal is written into the memory 106 (Steps S3 and S4). The contents of the memory 106 are read out and subjected to D/A conversion, and the digital signal is recorded on the magnetic disk (Steps S5 to S7). The recorded signal is immediately reproduced (Step S8) and it is determined whether a dropout time is smaller than a predetermined time (Step S9). If the dropout time is smaller than the predetermined time, it is determined whether an envelope output is greater than the predetermined value (Step S10). If the answers in Steps S9 and S10 are both affirmative (YES), the process is brought to an end (Step S14). If the answer in either one of Steps S9 and S10 is negative (NO), it is determined whether this decision is the first one (Step S11). In the case of the first decision, a track in which a recording failure has occurred is erased (Step S12), and the process returns to Step S5. If the answer in Step S11 is negative (NO), i.e., if the decision is the second one, a warning is issued (Step S13) and the process is brought to an end. In the case of the second decision, further recording may also be performed.

Figure 6:
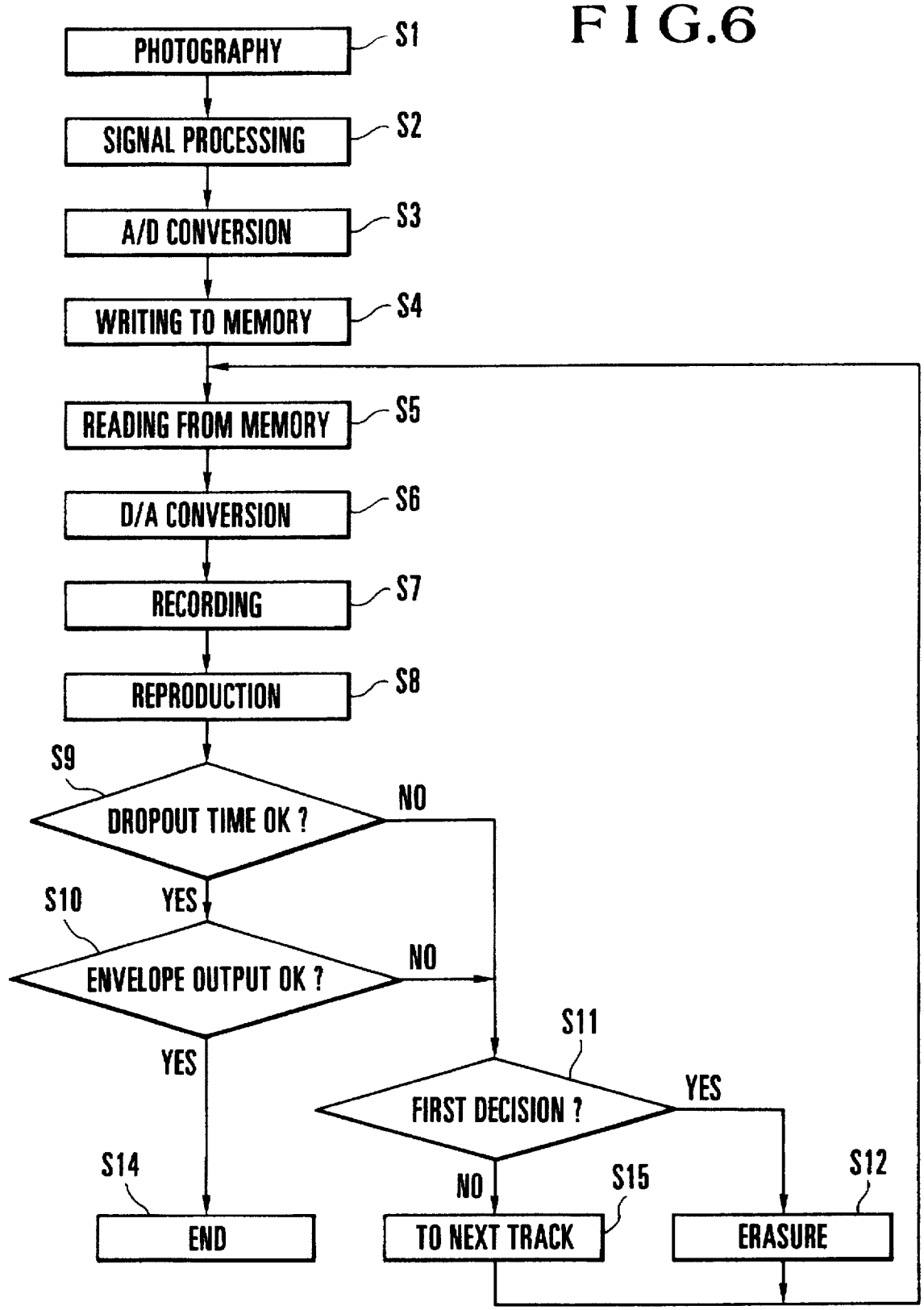
FIG. 6 is a flowchart showing the sequence of other recording precessing performed in the electronic still camera shown in FIG. 4.

FIG. 6 is a flowchart showing a modification of the second embodiment, in which Step S13 of FIG. 5 is replaced with Step S15.

In the flowchart of FIG. 6, if the answer in Step S11 is negative (NO), i.e., if the second recording has also failed, the next track is selected (S15), and the process returns to Step S5 in which re-recording is started.

This processing is intended to cope with the probability that if recording fails on a particular track over and again, the track may be scratched or covered with dust. According to the embodiment shown in FIG. 6, recording can be securely effected even in this case.

As is apparent from the above description, according to the second embodiment, even if an abnormal recording occurs by any cause, re-recording is immediately performed by using the image signal stored in the memory 106. Accordingly, it is possible to securely record a precious scene.

As is apparent from the above description, the still image signal recording and/or reproducing apparatus according to the first embodiment has the advantages that various input video signals each having a different amplitude can be recorded without distortion or gradational deterioration and that a signal can be reproduced without distortion or gradational deterioration from a recording medium on which signals are recorded at various levels.

With the electronic still camera according to the second embodiment, it is possible to securely record a precious scene.

What is claimed is:

1. A color image signal recording/reproducing apparatus arranged to record a color image signal on a recording medium, and/or to reproduce the color image signal recorded on the recording medium, comprising:

(a) operation mode instructing means for instructing either a recording operation mode in which the color image signal is recorded on the recording medium or a reproducing operation mode in which the color image signal recorded on the recording medium is reproduced;

(b) recording/reproducing means for receiving the color image signal, recording the received color image signal on the recording medium when said recording operation mode is instructed by the operation mode instructing means, and reproducing the color image signal recorded on the recording medium when said reproducing operation mode is instructed by the operation mode instructing means;

(c) selective output means for receiving a color image signal being externally supplied and the color image signal reproduced from the recording medium by said recording/reproducing means, outputting the received color image signal being externally supplied when said recording operation mode is instructed by the operation mode instructing means, and outputting the received color image signal reproduced from the recording medium when said reproducing operation mode is instructed by the operation mode instructing means;

(d) level adjusting means for adjusting automatically the level of either the color image signal being externally supplied or the color image signal reproduced from the recording medium by said recording/reproducing means outputted from said selective output means, and outputting the level adjusted color image signal;

(e) memory means for receiving the color image signal outputted from said level adjusting means for converting the received color image signal into a digital color signal, and storing temporarily the digital color image signal; and (f) control means for controlling an operation for each part so as to record the received color image signal on the recording medium by said recording/reproducing means when said recording operation mode is instructed by the operation mode instructing means and to reproduce the color image signal recorded on the recording medium by said recording/reproducing means when said reproducing operation mode is instructed by the operation mode instructing means, and then to proceed for operating the reproduction if an abnormality is not detected in the reproduced color image signal, and to record on the recording medium the color image signal stored in said memory means if an abnormality is detected in the reproduced color image signal.

2. A color image signal recording/reproducing apparatus according to claim 1, further comprising digital/analog converting means for converting to an analog color image signal the digital color image signal outputted from said memory means and outputting the analog color image signal, and said recording/reproducing means arranged to receive the analog color image signal outputted from said digital/analog converting means and to record the received analog color image signal on the recording medium.

3. A color image signal recording/reproducing apparatus arranged to record a color image signal on a recording medium and/or to reproduce the color image signal recorded on the recording medium, comprising:

(a) operation mode instructing means for instructing either a recording operation mode in which the color image signal is recorded on the recording medium or a reproducing operation mode in which the color image signal is reproduced from the recording medium;

(b) selective output means for receiving a color image signal being externally supplied and the color image signal reproduced from the recording medium by said recording/reproducing means, outputting the color image signal being externally supplied when said recording operation mode is instructed by the operation mode instructing means, and outputting the color image signal reproduced from the recording medium when said reproducing operation mode is instructed by the operation mode instructing means;

(c) level adjusting means for adjusting automatically the level of either the color image signal being externally supplied or the color image signal reproduced from the recording medium outputted from said selective output means and outputting the level adjusted color image signal;

(d) memory means for receiving the color image signal outputted from said level adjusting means for converting the received color image signal into a digital color signal, and storing temporarily the digital color image signal;

(e) recording/reproducing means for receiving the color image signal, recording the received color image signal on the recording medium when said recording operation mode is instructed by the operation mode instructing means, and reproducing the color image signal recorded on the recording medium when said reproducing mode is instructed by the operation mode instructing means;

(f) detecting means for detecting whether an abnormality has occurred in the color image signal reproduced from the recording medium by said recording/reproducing means; and (g) control means for controlling an operation for each part so as to record the received color image signal on the recording medium by said recording/reproducing means when said recording operation mode is instructed by the operation mode instructing means and to reproduce the color image signal recorded on the recording medium by said recording/reproducing means when said reproducing operation mode is instructed by the operation mode instructing means, and to proceed for operating the reproduction if said detecting means does not detect an abnormality in the reproduced color image signal, and to record on the recording medium the color image signal stored in said memory means if said detecting means detects an abnormality in the reproduced color image signal.

4. A color image signal recording/reproducing apparatus according to claim 3, wherein said detecting means is arranged to detect whether the time interval during which the level of the color image signal reproduced from said recording medium by said recording/reproducing means is less than a predetermined level is longer than a predetermined time interval, and, if the detected result shows that the time interval is longer than the predetermined time interval, to detect that an abnormality has occurred in the color image signal reproduced from said recording medium by said recording/reproducing means.

* * * * *